Dec. 8, 1959     C. L. HANCOCK     2,915,847
LINE HOLDER FLOAT
Filed Dec. 23, 1957
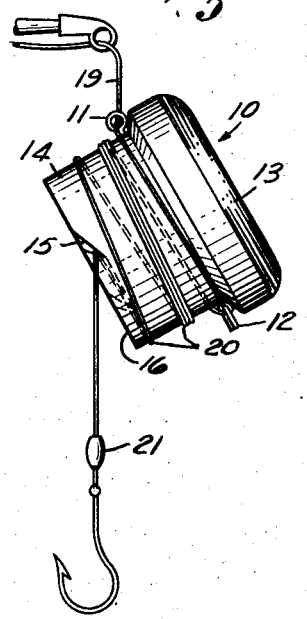
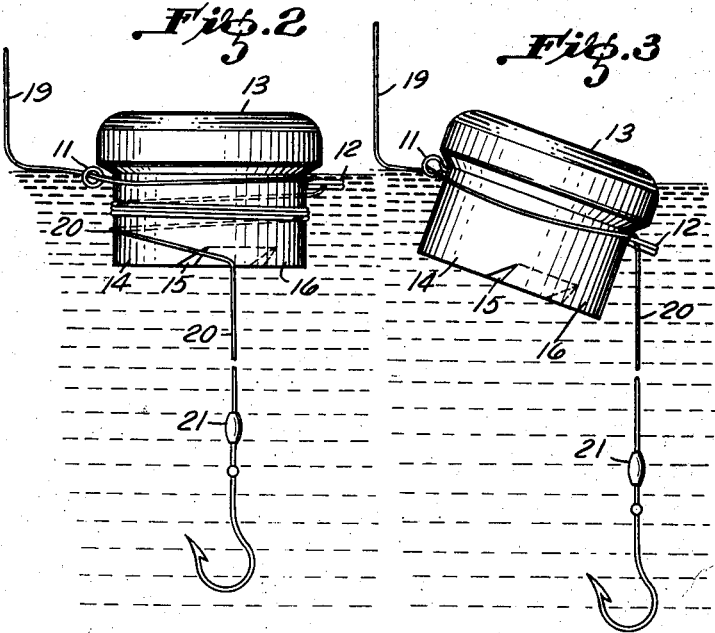
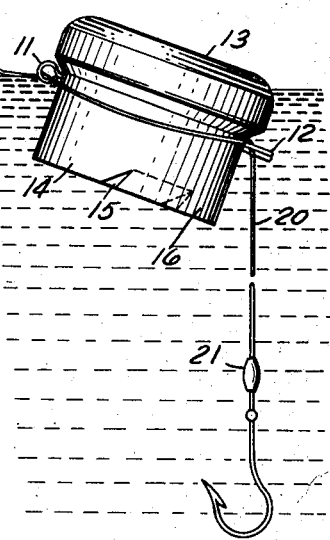
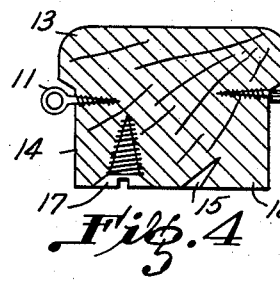
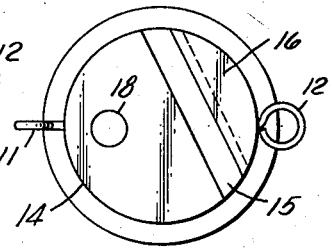
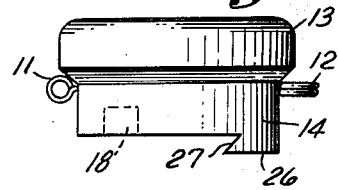
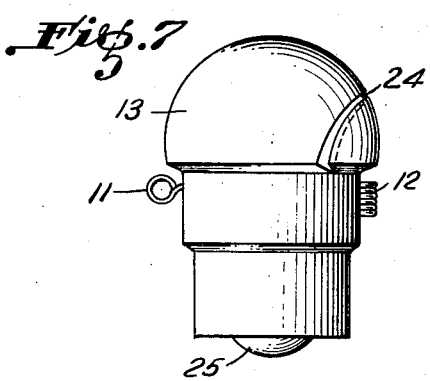
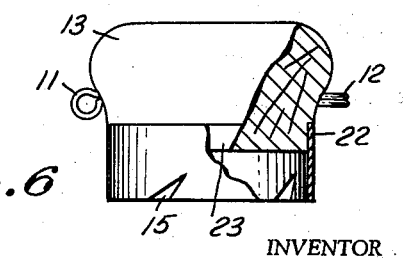
INVENTOR
Charles L. Hancock
BY
ATTORNEYS United States Patent Office
2,915,847
Patented Dec. 8, 1959

2,915,847

LINE HOLDER FLOAT

Charles L. Hancock, Hot Springs, S. Dak.

Application December 23, 1957, Serial No. 704,542

4 Claims. (Cl. 43—43.11)

This invention relates to a new and improved line holder float, or fish line bobber, especially adapted for casting with rod and reel.

Heretofore, the need for an entirely satisfactory bobber for casting with the sinker, leader, and bait as a compact unit without snarling or tangling, which will release the weighted float line as it strikes the water, without spinning, to the desired depth, has been recognized and various attempts to solve this problem have been made, but without much success. None of these known devices nor any of those disclosed in the prior art is without fault, in one or more respects.

The necessary considerations to be satisfied in solving this problem are more real than apparent. Only a rod and reel can give a long distance cast and so extend the effective fishing area of the fisherman from the shore line or fixed post. To attempt this with the sinker and hook trailing behind the bobber would be clumsy indeed, if not well nigh impossible.

When the bobber, sinker, leader, hook and bait are rigged and arranged as a compact unit, this necessitates a simple, certain and ready release of these elements downwardly from the bobber as soon as it strikes the water, as well as the further necessity of doing this without unwinding and spinning, which agitates the water, scares the fish, and often entangles the lines.

The bobber must remain securely attached at one point to the float line, now suspended below the bobber in the water, so that the bobber will clearly indicate a strike. Yet, the bobber must be loosened to slide along the line to the sinker, as the line is reeled in, so as not to hinder landing the catch.

Other considerations are also very important. The bobber should be simple in construction, with no moving parts, easily and cheaply manufactured. The design should be such that it is fool proof and reliable when subjected to hard and continuous use. In use, the fisherman, even a novice, should find this easy and quick to operate and to reuse, with little care or thought.

The primary object of my invention is to fully satisfy this need with a simple structure without moving parts, easy to operate, positive in action and cheap to manufacture.

An object of this invention is to provide a line holder float which will carry the float line wound thereon to the end of the cast, then release it by a gravity drop without unwinding and spinning, which would result in agitating the water and often also in entangling the lines as happens in other devices.

A further object of this invention is to provide this float in a simple structure which will remain securely attached at one point to the float line, yet will be easily loosened to slide along the line to the sinker, as the line is reeled in.

Other objects of the invention will be apparent by reference to the following detailed description and claims taken in conjunction with the accompanying drawing, in which:

Figure 1 is an elevation of the line holder float suspended in air, from a rod with reel, ready for casting.

Figure 2 is an elevation of the float as it strikes the water.

Figure 3 is an elevation of the float after the float line has dropped from the float and is taut under pull from the sinker.

Figure 4 is an elevation of the float in section along the center line.

Figure 5 is a bottom view of the float.

Figure 6 is an elevation, partly in section, of a second modification of the invention.

Figure 7 is an elevation of a third modification of the invention.

Figure 8 is an elevation of a fourth modification of the invention.

Many attempts have been made, since first attempting to cast a fish line with a bobber fixed thereon with rod and reel, to overcome the difficulties attending the use of the bobber in such casting. As noted, not much progress has been made towards a complete solution, heretofore. My new device, disclosed herein, is a distinct advance in this art, and a complete solution to all the difficulties, enumerated above. It is an improvement over the older structures, some of which are on the market. These older structures embody principles such as found in the following U.S. patents:

C. L. Louthan, 2,592,441—Apr. 8, 1952, 43–43.11
W. P. Brzezinski, 2,603,905—July 22, 1952, 43–43.11
N. M. Wright, 2,678,511—May 18, 1954, 43–43.11
A. C. Bond, 2,760,295—Aug. 28, 1956, 43–43.11

In the drawings each of the numerals refer to corresponding parts in each of the modifications. The first modification of the line holder float seen in Figures 1–5 inclusive, comprises a float body 10 of buoyant material such as wood, plastic, cork or a light synthetic composition, an outwardly extending element or eye 11 with threaded or pointed stem and spring clip or holder 12 having two or more contiguous loops fixed in position with a threaded or pointed stem or with small screws or other suitable means.

The body 10 preferably is circular in cross section but may be of other convenient sectional shape. The head 13 has a larger flange-like sectional area than the lower body section 14 and acts as a flange on the end of a spool. The lower body 14 is cylindrical in shape and has across the bottom thereof an undercut narrow shaped slot 15, as seen in Figure 5, which defines a segment 16 extending over an arc of about 120°. The eye 11 and spring holder 12 are positioned on opposite sides of the lower body and extend outwardly therefrom and partially under the flanged head 13. The V-shaped slot 15 is near spring holder 12 and at a wide angle to a directional line between eye 11 and spring holder 12 and faces toward the eye 11. In the bottom of lower body section 14 a balance weight, such as a screw 17 or lead pellet 18, is fixed in a countersunk hole and positioned between slot 15 and eye 11, but nearer eye 11. The slot 15 intersects the periphery of lower body 14 to form two inverted V's whose apexes are closer together than their sides, as seen in Figure 2.

In use, suspension line 19 is threaded through eye 11 for the length desired, designated as float line 20 to the sinker and hook. Line 19 is then inserted between loops of spring holder 12 and the leader with sinker 21 and the hook is then attached. The float line 20 from holder 12 to the end is wound around lower body 14 and the end part is laid back in slot 15, where it is snugly fitted without binding and then once or twice around segment 16 with the sinker 21 now positioned adjacent slot 15. In this compact form, as seen in Figure 1, the float, sinker, hook and bait are suspended from the rod and reel and ready to cast.

The second modification seen in Figure 6 is the same as the first described above, except the lower body section 22 is formed of suitable sheet material in cylindrical form in a single piece or in sections, such as metal or plastic fitted tightly onto a circular shoulder 23 or molded into place below the eye 11 and spring holder 12 which are positioned just below head 13. This lower body 22 is weighted in any suitable manner on the side below eye 11. A recess constituting a slot 15 is cut in the lower body and arranged as is slot 15 in Figure 2.

The third modification seen in Figure 7 is similar in shape to the others, as is shown. The slot 24 in this instance is diagonally across one side of the head as an undercut V-shape extending up from an edge of the head 13 near spring holder 12. The bottom has a metallic weight 25 affixed as shown, which may be pressed, driven or threaded into a recess.

The fourth modification seen in Figure 8 is similar in structure to that seen in Figure 1, except the segment 26 extends below the normal bottom of lower body section 14 in such fashion as to form a narrow undercut V-shaped slot 27 as an extension of the bottom of body 14.

Operation

As indicated above, the suspension line 19 is threaded through eye 11 and led across and fixed into spring holder 12 between the loops, as seen in Figure 1. Each of the modifications is operated in the same manner. From holder 12, the line with sinker, leader and hook now attached and designated float line 20, is wound on the lower body with its end section laid in slot 15 or 27 and wrapped once or twice around segment 16 or 26 with the sinker adjacent the slot, and hanging below the float, with leader, hook and bait. The fisherman now casts this compact unit from his rod and reel in the usual fashion.

As the float strikes the water, seen in Figure 2, the end of float line 20 is drawn by gravity pull on sinker 21 out of slot 15, 24 or 27 to the position shown. The remainder of line 20 now slides off lower body 14 or 22 and the float drops to the position seen in Figure 3 with float line 20 taut. When a fish strikes the hook, the sudden jerk on line 20 dunks the line holder float 10 and releases line 20 from spring holder 12. As the line 19 is reeled in, the float slides down to sinker 21 to accommodate the line being wound onto the reel. After the hook is free, the desired length of line is then again drawn out, fixed in spring holder 12 and wound on lower body 14 for the next cast.

Having thus disclosed my invention, I claim:

1. A float adapted to be attached to a fish line and cast with sinker, leader, hook and bait as a compact unit from a rod and reel, comprising a buoyant body, having a head and pendent lower body section of rounded contours in lateral cross section of less diameter than the head, so as to form a spool section to receive the fish line wound thereon, an outwardly extending element beneath the head to receive and hold the fish line in sliding contact and a holder to resiliently grip the line in spaced relation to the element, the float having a low center of gravity to cause the float to be buoyed with head normally upright and there being a narrow V-shaped undercut slot in the surface of the float facing generally towards the said element, but nearer the holder to restrain the release of the fish line leading to the hook until the float is cast onto the water.

2. A float adapted to be attached to a fish line and cast with sinker, leader, hook and bait as a compact unit from a rod and reel, comprising a buoyant body, having a head and pendent lower body section of rounded contours in lateral cross section of less diameter than the head so as to form a spool section to receive the fish line wound thereon, an outwardly extending element beneath the head to receive and hold the fish line in sliding contact and a holder to resiliently grip the line in spaced relation to the element, the float having a low center of gravity to cause the float to be buoyed with head normally upright and the body having a narrow V-shaped undercut slot in the surface of the float at the bottom of the lower body section and facing generally towards the element, but nearer the holder to restrain the release of the fish line leading to the hook until the float is cast onto the water.

3. A float adapted to be attached to a fish line and cast with sinker, leader, hook and bait as a compact unit from a rod and reel, comprising a buoyant body, having a head and pendent lower body section of rounded contours in lateral cross section of less diameter than the head, so as to form a spool section to receive the fish line wound thereon, an outwardly extending element beneath the head to receive and hold the fish line in sliding contact and a holder to resiliently grip the line in spaced relation to the element, the float having a low center of gravity to cause the float to be buoyed with head normally upright and the body having a narrow V-shaped undercut slot formed between a segment projecting downwardly below the normal bottom of the lower body section and the section itself and facing generally towards the element, but nearer the holder to restrain the release of the fish line leading to the hook until the float is cast onto the water.

4. A float adapted to be attached to a fish line and cast with sinker, leader, hook and bait as a compact unit from a rod and reel, comprising a buoyant body, having a head and pendent lower body section of rounded contours in lateral cross section of less diameter than the head, so as to form a spool section to receive the fish line wound thereon, an outwardly extending element beneath the head to receive and hold the fish line in sliding contact and a holder to resiliently grip the line in spaced relation to the element, the float having a low center of gravity to cause the float to be buoyed with head normally upright and the body having a narrow V-shaped undercut slot in the surface of the float in the head section and facing generally towards the element, but nearer the holder to restrain the release of the fish line leading to the hook until the float is cast onto the water.

References Cited in the file of this patent

UNITED STATES PATENTS

| | | |
|---|---|---|
| 2,374,752 | Johnson | May 1, 1945 |
| 2,720,720 | Landrum | Oct. 18, 1955 |
| 2,760,295 | Bond | Aug. 28, 1956 |
| 2,775,056 | Sneed | Dec. 25, 1956 |
| 2,807,115 | Turner | Sept. 24, 1957 |

FOREIGN PATENTS

| | | |
|---|---|---|
| 123,526 | Sweden | Dec. 7, 1948 |
| 465,894 | France | Feb. 17, 1914 |
| 628,669 | Great Britain | Sept. 2, 1949 |